United States Patent [19]

Conradson et al.

[11] Patent Number: 5,307,282

[45] Date of Patent: Apr. 26, 1994

[54] METHOD OF COMPUTER-AIDED PREDICTION OF COLLISIONS BETWEEN OBJECTS INCLUDING FABRICATION TOOLS AND PARTS TO BE FABRICATED

[75] Inventors: Scott A. Conradson, Palo Alto; Lee A. Barford, Mountain View, both of Calif.

[73] Assignee: Hewlett-Packard Company, Palo Alto, Calif.

[21] Appl. No.: 431,945

[22] Filed: Nov. 6, 1989

Related U.S. Application Data

[63] Continuation-in-part of Ser. No. 411,344, Sep. 22, 1989.

[51] Int. Cl.⁵ .......................................... G06F 15/46
[52] U.S. Cl. ................................................ 364/468
[58] Field of Search ................ 364/474.24, 472, 468; 29/400.1, 407, 404, DIG. 3

[56] References Cited

U.S. PATENT DOCUMENTS

| | | | |
|---|---|---|---|
| 4,789,931 | 12/1988 | Kuragano et al. | 364/474.21 X |
| 4,819,467 | 4/1989 | Graf et al. | 364/476 X |
| 4,831,549 | 5/1989 | Red et al. | 364/167.01 X |
| 4,868,761 | 9/1989 | Hayashi | 364/474.24 |
| 4,887,221 | 12/1989 | Davis et al. | 364/474.24 X |
| 4,922,440 | 5/1990 | Kawamura et al. | 364/474.24 |
| 4,945,487 | 7/1990 | Kimura et al. | 364/474.29 X |
| 4,947,666 | 8/1990 | Hametner et al. | 72/37 |
| 4,984,180 | 1/1991 | Wada et al. | 364/474.24 X |

OTHER PUBLICATIONS

An Algorithm For Planning Collison-Free Paths Among Polyhedral Obstacles Loranzo-Perez, et al. Communications of the AMC Oct. 1979 vol. 22, No. 10 pp. 560–570.

Creating And Using Data A Features Data Base, Luby et al., Computers In Mechanical Engineering Nov. 1986 pp. 25–33.

Automated Flat Pattern Layout From Three Dimensional Wire-Frame Data Reich, et al. Lehigh University Dec. 1988 pp. 1–20.

Solid Modeling And The Interface Between Design And Manufacture, M. J. Pratt IEEE CG&A Jul. 1984 pp. 52–59.

Computer Recognition and Extraction of Form Features: A CAD/CAM Link Henderson et al. Elsevier Computers In Industry (North Holland) 1984 pp. 329–339.

Eliminating Redundant Primitives From Set Theoretic Solid Models By A Consideration Of Constituents, J. R. Woodwark, May 1988 pp. 37–47.

Designing With Features: Design And Analysis Of Extrusions As An Example Libardi, et al. Presented At Spring National Engineering Conference And Show Mar. 24–27, 1986 Chicago pp. 1–8.

Primary Examiner—Robert W. Beausoliel, Jr.
Assistant Examiner—Allen Lo

[57] ABSTRACT

A CAD system and method for designing sheet metal parts. A proposed design is automatically tested against a set of design rules. Available tools are selected according to criteria computed with reference to the part to the fabricated and then are tested to determine whether they can be used to make desired bends. A fabrication sequence is computed.

5 Claims, 14 Drawing Sheets

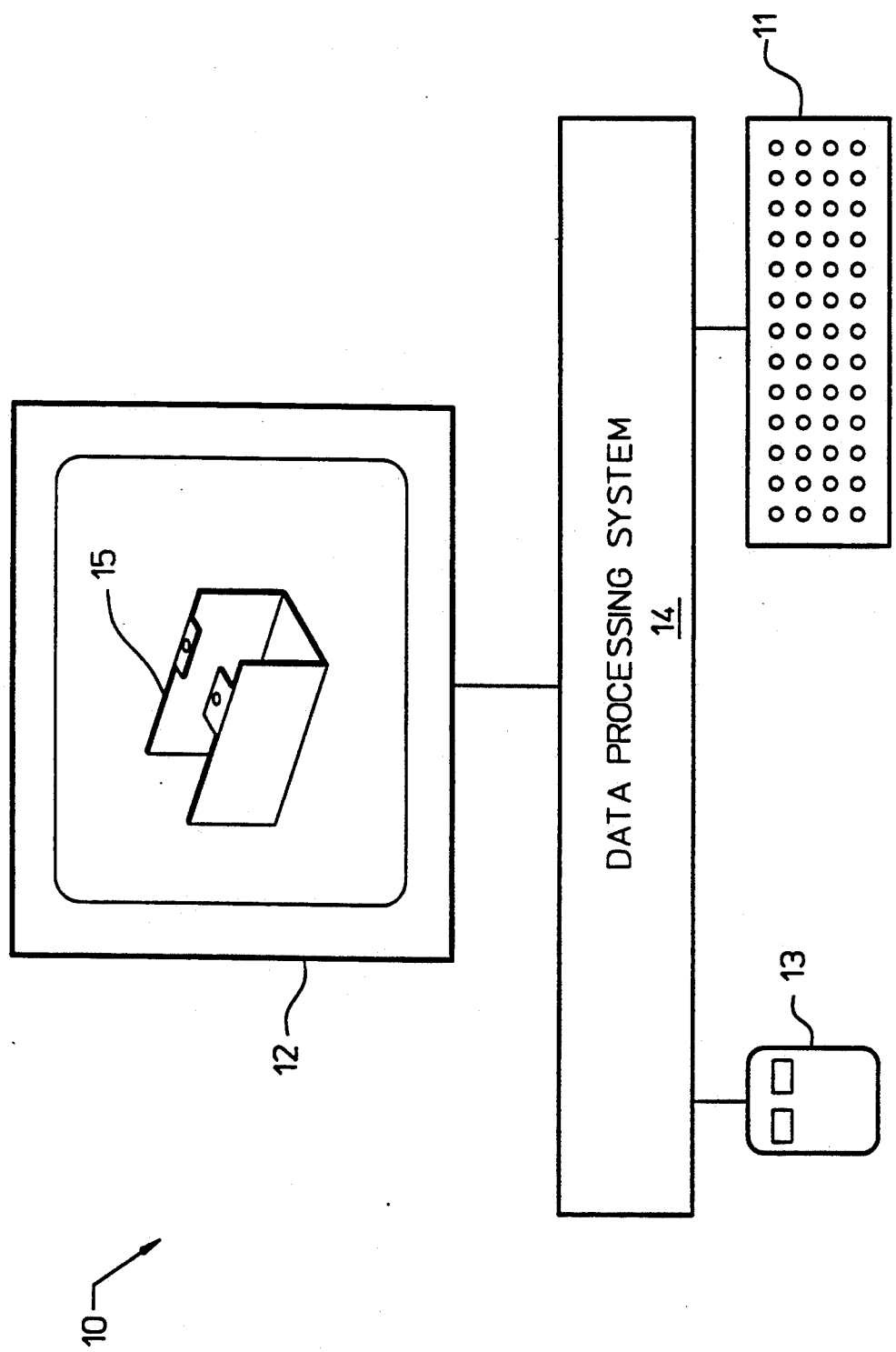

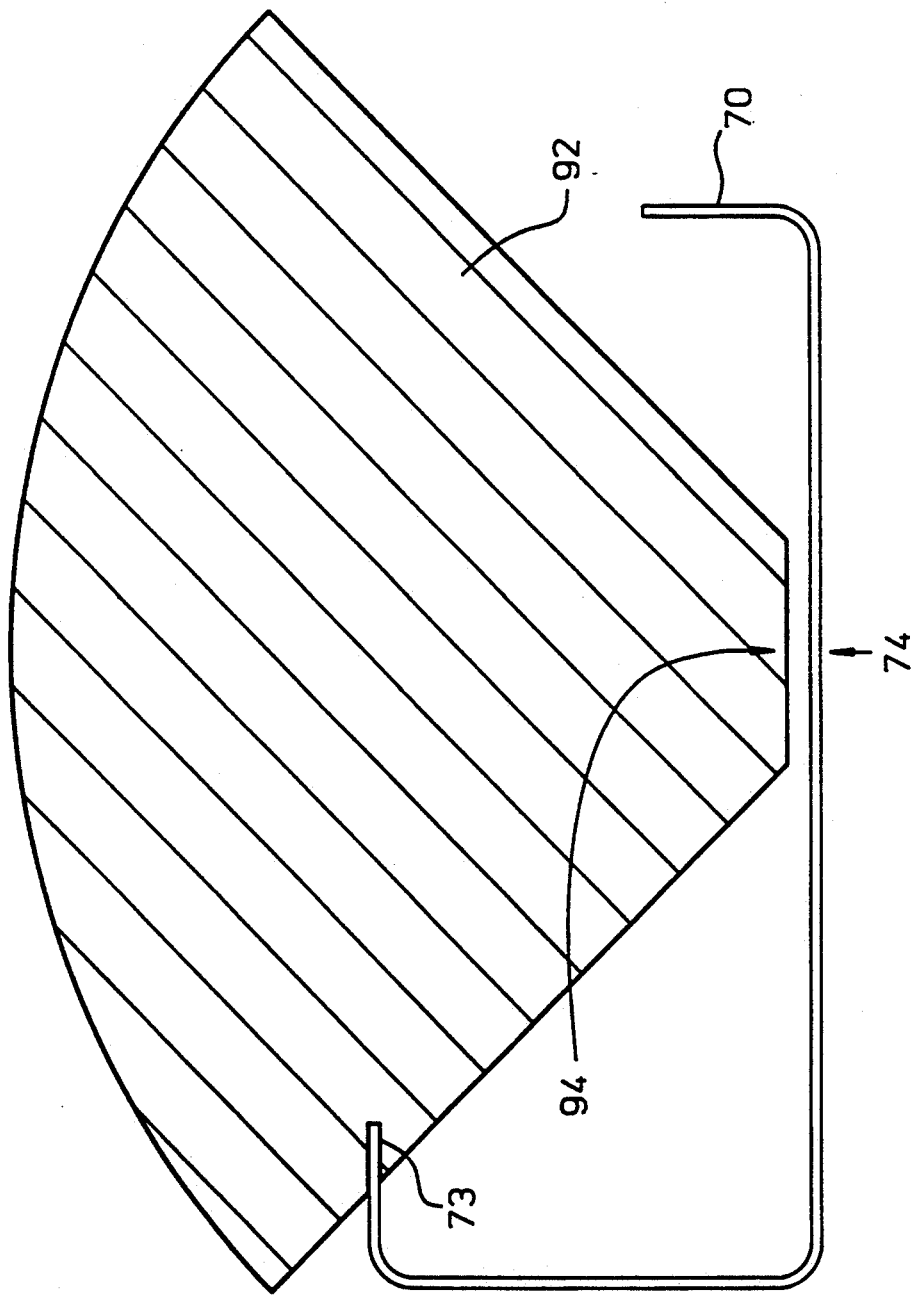

METHOD OF COMPUTER-AIDED PREDICTION OF COLLISIONS BETWEEN OBJECTS INCLUDING FABRICATION TOOLS AND PARTS TO BE FABRICATED

CROSS-REFERENCE TO RELATED APPLICATION

This is a continuation-in-part of copending U.S. patent application Ser. No. 07/411,344, filed Sep. 22, 1989.

BACKGROUND OF THE INVENTION

The present invention relates to computer aided design systems and, more particularly, to a system which utilizes parameter checking for designing mechanical parts and which is particularly well suited for designing parts that are to be fabricated from sheet metal and the like.

Computer-Aided Design (CAD) systems are well known in certain fabrication arts. Typically, a CAD system comprises a graphic work station and computer software. Such a CAD system enables a designer to draw a part, view the part from various perspectives, and compute various data related to the part, such as the material needed to construct the part. In addition, a CAD system which is specifically designed for a known manufacturing process such as a semiconductor fabrication process may test the design by applying a predetermined set of design rules to find out whether the design satisfies the rules.

CAD systems in the mechanical fabrication arts are less sophisticated than those in such arts as the semiconductor fabrication arts in terms of their ability to test part designs. For example, currently available systems for designing mechanical parts to be fabricated of sheet metal require the designer to be knowledgeable in a set of design rules governing such matters as minimum permissible radii of curvature of bends and minimum spacings between a hole in a surface and edge of that surface. Testing a complicated mechanical design against such a set of rules can be a tedious, time-consuming process for a designer.

In addition to knowing these design rules, the designer must be thoroughly familiar with the tooling and fabrication methods of the shop in which the part is to be fabricated. A sheet metal part generally is fabricated by bending various portions of a flat sheet of metal. Any given shop has various machines and tools that are used to make such bends. The tools which are available, and the capabilities of those tools, vary from shop to shop. Requiring the designer to know the capabilities and limitations of a given shop places an undue burden on the designer and limits the efficiency of the design process.

Moreover, there usually are many different sequences in which a set of bends can be made. Different tools may be needed according to which sequence is selected. A sequence of fabrication steps specified by the designer may not be an optimum method for fabricating the part because the order in which various portions of an initially-flat sheet of material are bent can dramatically affect the yield and fabrication time. In fact, limitations of the available tooling sometimes make it impossible to make a part according to a sequence of bends specified by the designer. Requiring the designer to check a plurality of bending sequences against the available bending tools and processes to find an efficient order of bending to fabricate a complicated mechanical part is not practical.

CAD systems which provide a designer with design rules on an interactive basis have been proposed but have not adequately met the need for a system for designing mechanical parts, especially parts to be fabricated from sheet metal.

From the foregoing it will be apparent that there is a need for a CAD system that can automatically test a proposed design of a desired mechanical part against a set of parameters and that can determine an efficient process plan for making the part, including specifying a set of fabrication tools and a sequence of fabrication steps.

SUMMARY OF THE INVENTION

The present invention provides a system and method for automatically testing a desired mechanical part against a set of parameters and determining an efficient process plan for making the part. More particularly, the present invention provides a computerized method of predicting collisions between objects such as a part being designed and a tool which is proposed for use in fabricating the part. The process plan includes a specified set of fabrication tools and a sequence of fabrication steps.

Briefly and in general terms, a computer-aided design system according to the invention includes an input for receiving data descriptive of a desired mechanical part, a storage unit for storing parameters, computing means for automatically testing whether the part satisfies the parameters, and an output for giving the test results.

The invention improves productivity throughout the product design cycle. This is accomplished by interactively providing feedback to the designer early in the design process while changes are relatively easy to make. The manufacturability of a design is enhanced by automatically analyzing the manufacturability and giving feedback to the designer in near real time.

The data which describes the part preferably includes information such as dimensions of various surfaces and angular relationships such as bends or other joints between adjacent surfaces.

The parameters may include design rules such as minimum radii of curvature of a bend and minimum spacing between a hole and an edge of a surface.

The parameters may include descriptions of fabrication tools. The computing means tests the part by determining whether any of these tools can be used to bend a sheet of material to satisfy the required relationships among surfaces of the part. In a preferred embodiment this is done by computing any relevant criteria for a particular bend, eliminating from consideration any tools not meeting those criteria and then determining whether one of the remaining tools can make the bend. For example, a given bend may require a tool having a length at least as long as the bend itself; the computer calculates that length and then tests only those tools that are long enough to do the job.

The computing means determines whether a given tool can be used to make a given bend by, for example, generating a representation of an expanded part similar to the desired part but in which the given bend has been flattened, generating a representation of an expanded tool similar to the given tool but in which the tool has been expanded, and superimposing the representations of the expanded tool and the expanded part. If there is no overlap, the tool can be used to fabricate the bend.

In one embodiment, linear programming techniques are used to test a tool to see whether it will collide with the part while being used to fabricate the part. The tool and the part are represented by convex polyhedra and a linear function is optimized over the polyhedra and time.

Preferably, the part is tested against all applicable design rules and available tooling without any intervention of the designer. If the desired part fails to satisfy the rules or cannot be made with the available tools, the designer is so informed. Otherwise, the system generates a process plan that includes an enumeration of all the tools needed to fabricate the part and a sequence of fabrication steps.

The system can be instructed to compute all possible sequences of fabrication steps so as to select the best possible sequence. This is done by starting with the part in its fully-bent state and checking each bend in turn to determine whether the available tooling will permit that bend to be done last in the sequence. Any sequence in which that bend cannot be done last is eliminated from further consideration. This procedure is iterated either until all possible sequences have been examined or until a sufficient number have been examined to assure that a good fabrication order has been determined.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1A is block diagram of a CAD apparatus according to the present invention;

FIG. 9 is a cross-sectional view of an expanded tool positioned over a part which is to be bent with the corresponding tool;

DETAILED DESCRIPTION OF THE INVENTION

Figure 1B:
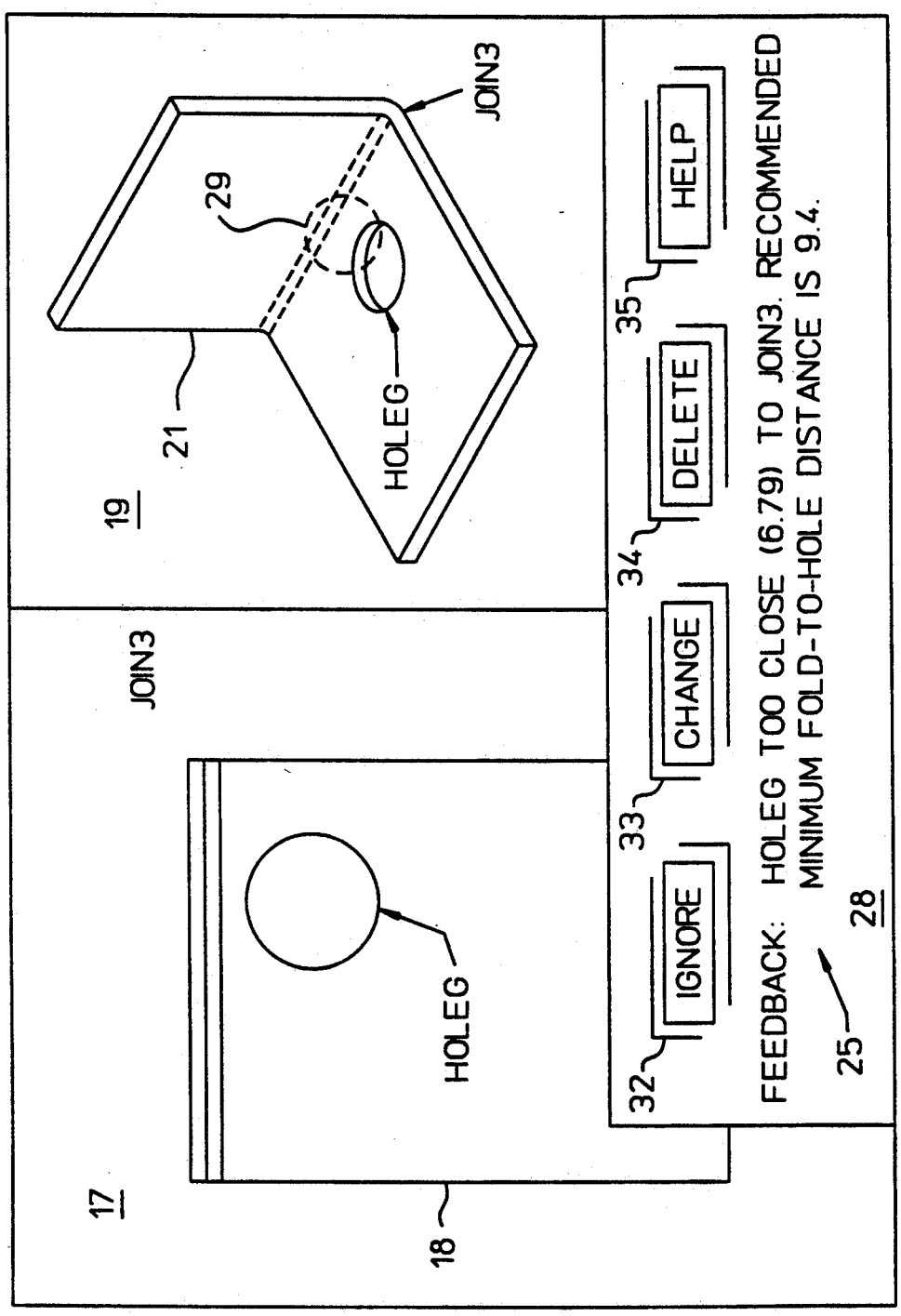
FIG. 1B illustrates an image of the kind that appears on the visual display screen of the apparatus shown in FIG. 1A when a design fails to satisfy a parameter.

As shown in the drawings for purposes of illustration, the invention is embodied in a novel CAD system for designing a mechanical part such as a part that is to be fabricated by bending a piece of sheet metal.

There has been a need in the mechanical design arts for a fast, simple way to determine whether a proposed design of a mechanical part meets the requirements of a set of design rules and whether a given shop has the necessary tools to make the part, but existing CAD systems have not been adequate to meet this need.

A CAD system according to the invention automatically tests a proposed design of a mechanical part against a set of design rules and determines a process plan for making the part, thereby greatly reducing both the amount of effort required by the designer of the part and the time necessary to design the part.

A preferred embodiment of the invention comprises a computer-aided apparatus such as a workstation 10 for designing a mechanical part to be fabricated of sheet metal, as shown in FIG. 1A.

In a preferred embodiment the invention comprises a computer-aided design system 10 for designing mechanical parts, as illustratively depicted in FIG. 1A. The system 10 includes input means such as a keyboard 11 and a mouse 13 for receiving data descriptive of a desired mechanical part, storage means such as a disk drive and a memory included in a data processing system 14 for receiving and storing a plurality of parameters, computing means such as a microprocessor and software also included in the data processing system 14 responsive to data received by the input means to automatically test whether a desired mechanical part described by the data satisfies any parameters which have been stored in the storage means; and output means such as a visual display screen 12 for communicating the results of the test.

Although the various functions to be described below are preferably implemented on a conventional data processing system in software, it will be apparent to those skilled in the art that special purpose hardware may also be utilized for various ones of these functions without departing from the teachings of the present invention.

A system 10 according to the invention is particularly well adapted for designing a mechanical part which is to be fabricated by bending a piece of sheet metal or the like. An image 15 of such a part is shown being displayed on the display 12 of FIG. 1A. When such a part is to be designed the input data which describes the part includes descriptions of the various surfaces of the part and any required angular relationships among the surfaces. Typically these angular relationships are bends, but occasionally a part may be fabricated by welding or otherwise joining together two adjacent edges.

The stored parameters may comprise any rules or constraints to which the part is subject. Typically these parameters include design rules such as minimum spacings between cutouts and adjacent bends. When the designer has furnished the data describing the part to the system, the system performs the test by determining whether the desired part satisfies these design rules. This testing is done automatically, that is, without any further input from or interaction with the designer.

The parameters may also comprise information descriptive of fabrication tools such as a set of all the tools that are available in a given fabrication shop. The system according to the invention performs the test by determining whether any of these tools can be used to bend a sheet of material to satisfy any required relationships among surfaces of the desired part.

The system preferably determines whether any of the tools can be used to accomplish a given bend by computing a criterion, selecting a tool which meets the criterion, and testing whether the selected tool can be used to bend the material to satisfy one of the required relationships. Using one or more such criteria to "screen" the tools before performing more detailed computations which are necessary to determine whether a given tool is capable of performing a given bend greatly improves the speed and efficiency of the design system.

The criteria against which the tools are selected are typically derived from physical characteristics of the part or of the particular bend to be performed. For example, one such criterion might be that only a tool which is as long as the bend itself can be used to perform a given bend.

The system preferably determines whether any of the tools can be used to make a given bend by, first, selecting a required angular relationship which is to be realized by bending the material from which the part is being fabricated. Next the system generates a representation of an expanded part similar to the desired part but in which the selected angular relationship has been flattened, selects one of the tools (preferably one that has already been determined to meet any pertinent criteria as explained above), generating a representation of an expanded tool similar to the selected tool but in which the tool has been expanded, superimposing the representation of the expanded tool and the representation of the expanded part such that a bending axis of the expanded tool is adjacent the selected angular relationship of the expanded part, and determining whether the superimposed representations overlap.

In one embodiment, a tool and the part are represented by convex polyhedra and a linear function is optimized over the polyhedra and time to check for any possible collisions between the part and the tool.

The system preferably tests the part against a set of design rules and a set of process rules and determines which tools can be used to make the part and in what order the tools should be used, all without operator involvement.

Any failure of the design to satisfy a parameter such as a design rule or a process rule is preferably reported as it occurs, that is, as soon as the designer enters an item of data that causes the as-yet-incomplete design not to satisfy the parameter.

A preferred method of providing this feedback to the designer is shown in FIG. 1B. A visual image generally 16 is being displayed on the screen 12 of the system as previously described. A user is designing a mechanical part. The image 16 includes a first window 17 in which the system is generating a top view 18 of the part. The image 16 also includes a second window 19 in which the system is generating a perspective view 21 of the part.

A feedback message 25 is being displayed in a pop-up feedback window 28. The feedback message 25 is preferably given by highlighting an area 29 to which the message is directed.

In response to the feedback message 25, a user is given the following options:

(a) ignore the guideline, for example by clicking on an "ignore" icon 32, (b) change the design in accordance with the guideline by clicking on a "change" icon 33 to have the system automatically, for example, move the hole away from the fold, (c) cancel the command which generated the feedback message by clicking on a "delete" icon 34 to have the system delete the hole, and (d) have the system explain the guideline by clicking on a "help" icon 35.

An analysis for a computationally-intensive failure to satisfy a parameter such as a process-planning rule is available on user request.

The invention provides a design environment in which manufacturing influences and constraints are communicated to design and manufacturing engineers at appropriate levels of abstraction throughout the design cycle. Feedback is provided interactively to the designer early in the design process while changes can still be made easily.

Manufacturability analysis is performed automatically. This analysis includes checking of design practices and the feasibility of producing the part with existing tooling as well as calculation of basic factors such as tolerance capabilities, yield and cost. The designer need not waste time identifying, locating and evaluating applicable information or waiting for an expert consultant. As will be described in more detail hereinafter, feedback is presented to the designer in the form of advice which the designer may accept or reject.

The model of the design contains information which facilitates manufacturing productivity. A process plan is generated for each part. The plan meets geometric process constraints and design tolerance restrictions. If the part is impossible to make due to these restrictions, the reasons are communicated to the designer, thereby lessening the time a manufacturing engineer would otherwise have to spend calculating and trying candidate process plans. Functional information respecting the design is saved by the system and is available for later use to prevent manufacturing changes which could impair the performance of the part. Rule violations and process problems are communicated early in the design process, thereby providing time to develop and implement any necessary process improvements or non-standard processes before the design of the part has been finalized and released for manufacture.

The manner in which the invention operates, as summarized above, will now be described in more detail. This discussion may be most easily understood with reference to the design and testing of a simple sheet metal part such as a part 20 shown in FIG. 2. Part 20 consists of a three-sided sheet structure having sides 22, 23 and 24. A tab 26 and a tab 27 are attached to edges of the sides 24 and 22, respectively. Each tab has a hole 30 and 31, respectively, therethrough.

The system designer begins by providing input data describing the shape of the part through the input devices 11 and 13. This data describes the various elementary surfaces, specifically the sides 22, 23 and 24, the tabs 26 and 27, and the locations at which these surfaces are connected and the angles between said surfaces.

To simplify the following discussion, it will be assumed that an elementary surface consists of a planar piece of sheet metal. It will be apparent to those skilled in the art that other elementary surfaces may also be utilized without departing from the teachings of the present invention. Graphic systems for specifying the shape of an object are well known in the computer graphic arts and hence will not be discussed in more detail here.

Information describing the material of which the part is to be made and the thickness of that material is preferably also provided to the system. Alternatively, the system provides manufacturable default values if the designer does not wish to specify this information. The system 10 includes a set of design rules which specify such requirements as minimum radii of curvature for sheet metal bends. These curvatures may be automatically selected when providing data describing the shape of the part 20. The system 10 stores a data structure which will be referred to as a "bend" for each of the locations at which two elementary surfaces are joined. An exemplary bend is shown at 34 in FIG. 2. The bend 34 includes information on the radius of curvature and the angle joining the two elementary surfaces.

As the description of each of the elementary surfaces is provided to the system, the system checks any applicable design rules to determine whether a rule has been violated. For example, one design rule may specify the minimum distance between the edge of a hole and a bend. If a hole were placed too close to a bend, the hole would be distorted by the bending operation. Hence, the system checks for holes in each surface near a bend, and if a hole is found the distance from the edge of the hole to the bend is checked against the minimum distance for the materials and thicknesses of the part. If the hole is too close to the bend, the designer is notified and asked for instructions. The designer is given an opportunity to alter the design or to inform the system that the rule violation is acceptable.

The information defining the bends is automatically updated when changes are made in the design. For example, if the position, thickness or dimension of an elementary surface is changed, the present invention automatically updates the information specifying all of the bends joined to the changed surface. This updating operation may include changing the radii of curvature of the bends as well as the bend angles and locations.

Figure 3:
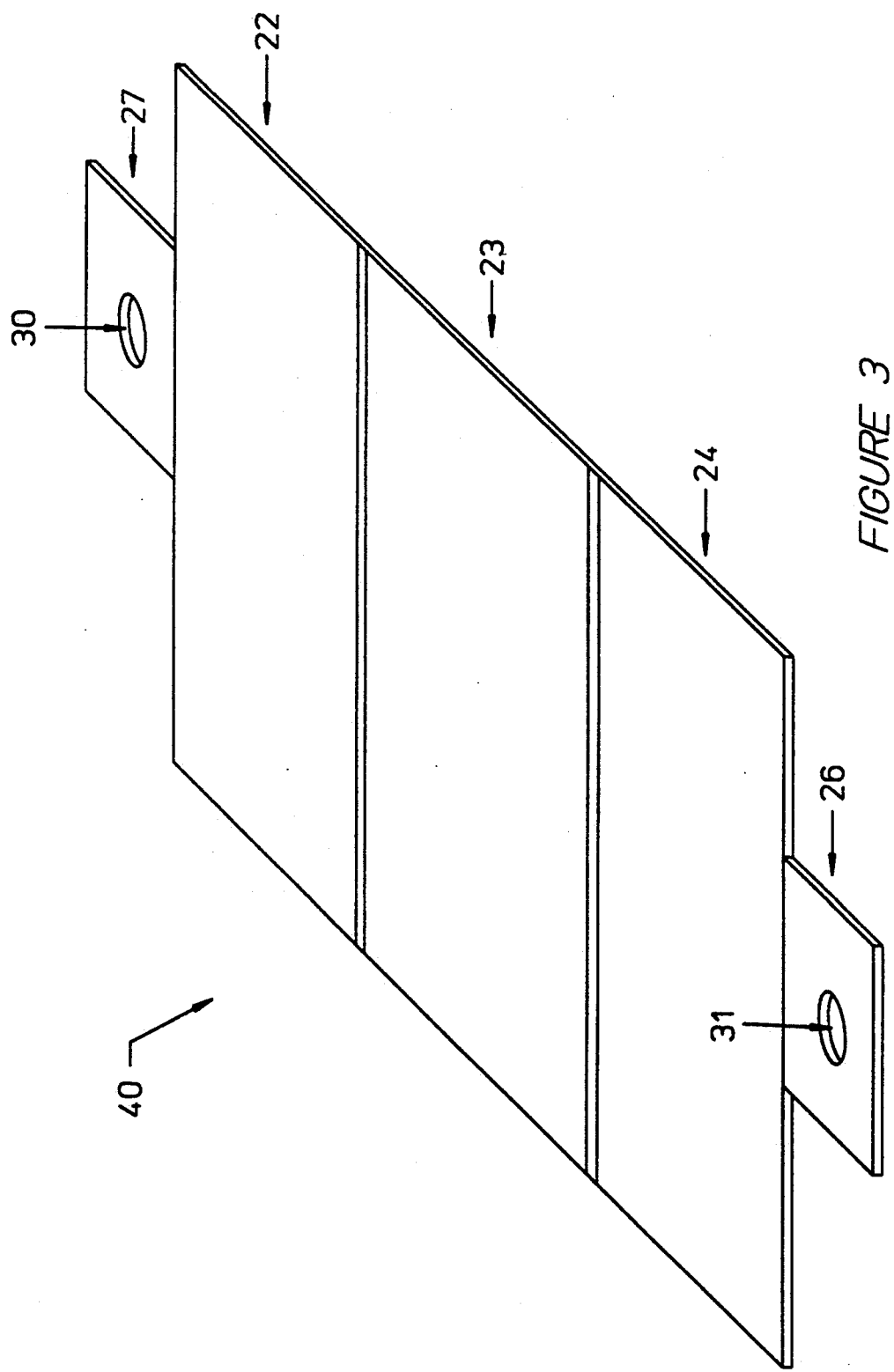
FIG. 3 is a perspective view of the part shown in FIG. 2 after the part has been flattened.

During the course of the three-dimensional design, the present invention can test the design to determine whether it can be implemented in sheet metal utilizing existing tooling. This testing is performed in two steps. In the first step, the various bends are unfolded; that is, each bend angle is increased to 180°. The unfolded, or flattened version of the part 20 is shown in FIG. 3 at 40. After all of the bends have been increased to 180°, the system 10 determines whether any two elementary surfaces overlap. If such an overlap exists, the part cannot be fabricated by bending a single flat sheet of metal, and if this condition is found the designer is notified and asked for instructions.

If the part 20 can be unfolded without any overlaps, then the part can be constructed by bending a single piece of sheet metal. However, this does not guarantee that the part can be fabricated with existing tooling in any given sheet metal shop. Hence, the system 10 performs a second level of testing to ascertain whether the part can, in fact, be fabricated with the available tooling. The manner in which this testing is carried out can be more easily understood by considering the manner in which a single bend is accomplished.

Figure 4B:
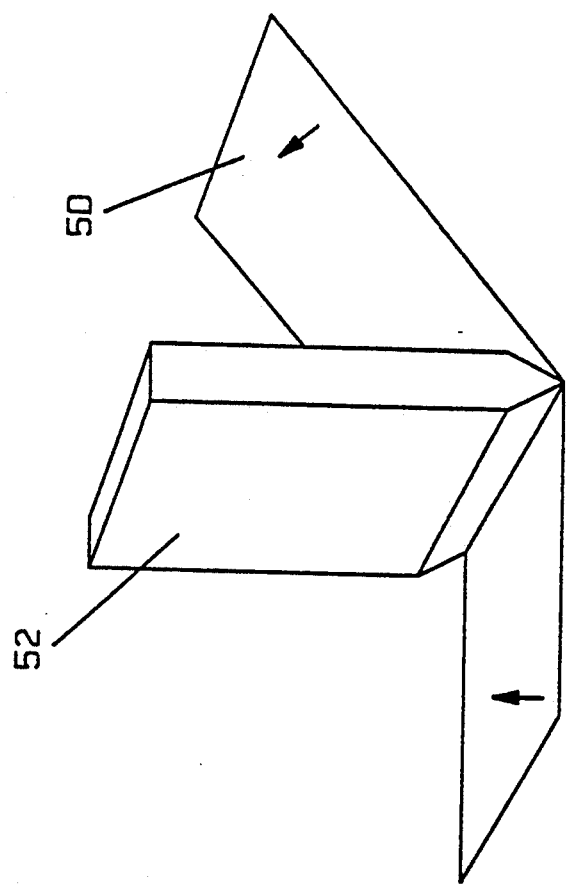
FIG. 4(b) illustrates the relationship of a bending tool to the sheet shown in FIG. 4(a) after the bend has been made.
Figure 4A:
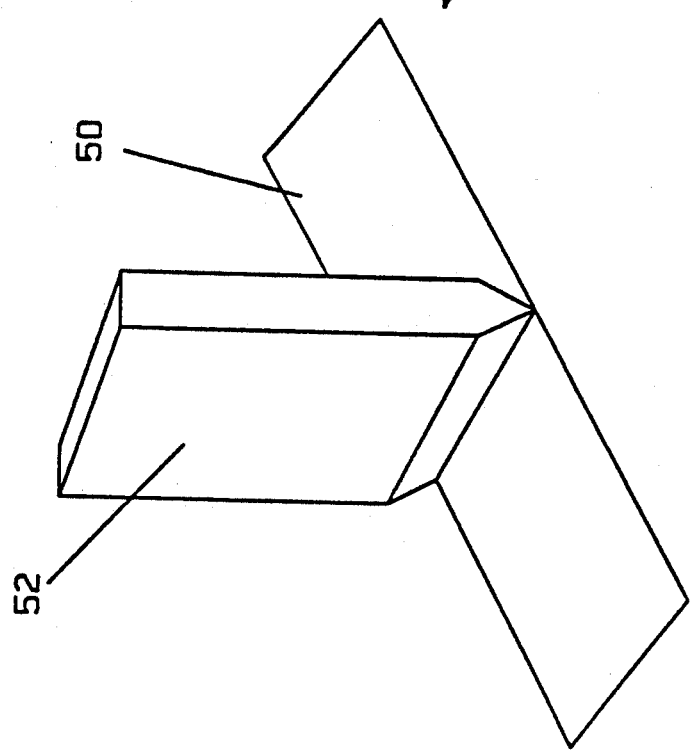
FIG. 4(a) illustrates the relationship of a bending tool to a sheet of metal before a bend is made.

Each of the bends in the part 20 is performed by pressing the unfolded part against a tool as shown in FIGS. 4(a)-(b) which illustrate a single bending of a sheet 50 against a tool 52. FIG. 4(a) illustrates the relationship of the tool and sheet before the bend and FIG. 4(b) illustrates the relationship of the tool and sheet after the bend.

Figure 6:
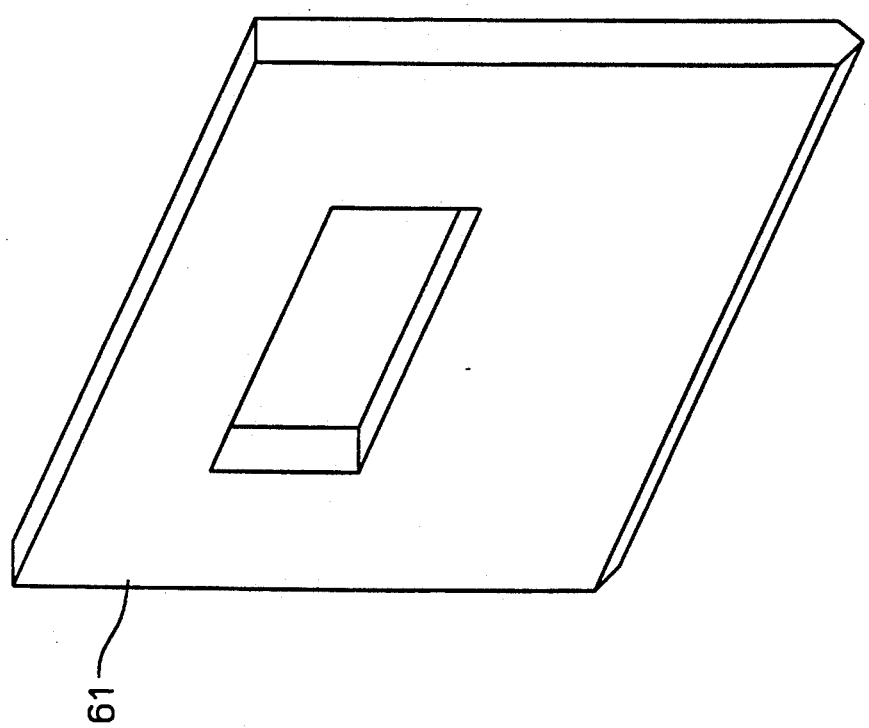
FIG. 6 is a perspective view of a tool with a cut-out therein.
Figure 5:
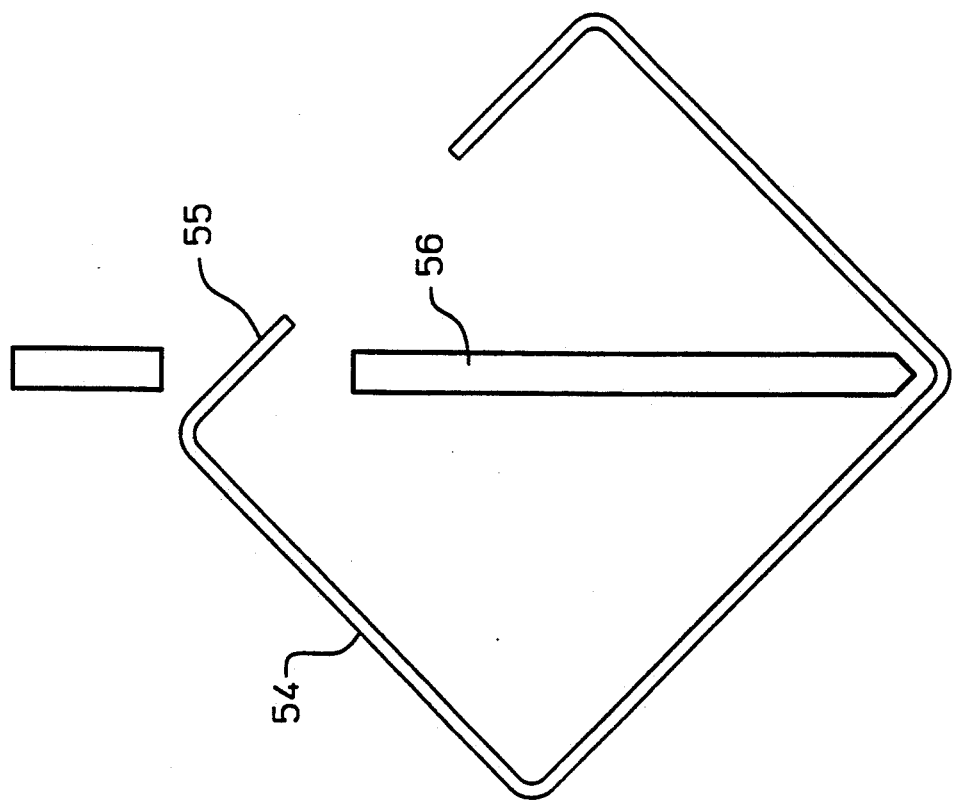
FIG. 5 is a cross-sectional view of a part which requires a special tool to fabricate.

Ordinarily, the length of the tool 52 must be at least as long as the bend, but sometimes a slightly shorter tool can be used with satisfactory results. In addition, the tool 52 must not intersect any portion of the part during the bending operation. FIG. 5 illustrates a case in which a portion 55 of a part 54 would have to pass through a tool 56 to successfully make the bend illustrated therein. Special purpose tools having cut-outs are often utilized for such bends. A perspective view of such a tool is shown in FIG. 6 at 61.

In the present invention, the system 10 must test each bend to be sure that the tool making the bend does not interfere with the motion of the part as the bend is taking place. If such an interference occurs, a different tool must be used, or the bends must be made in a different order.

Figure 7B:
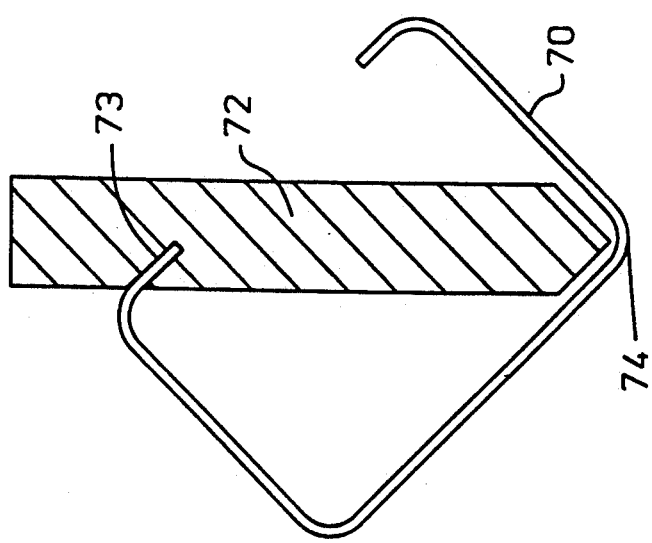
FIG. 7(b) is a cross-sectional view of the relationship of the tool to the part shown in FIG. 7(a) after being bent against the tool.
Figure 7A:
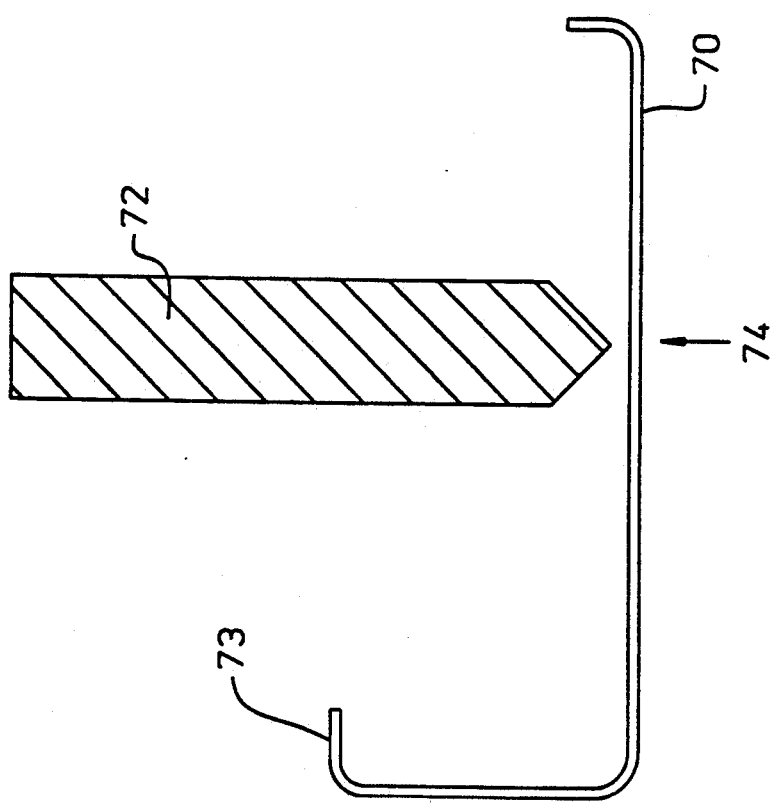
FIG. 7(a) is a cross-sectional view of a part before a bend is made.

The manner in which the system 10 tests for interference between a specific tool and a part during a single bending operation will now be discussed with reference to FIGS. 7(a)-(b) which show a cross-sectional view of a part 70 before and after being bent against a tool 72. The part 70 corresponds to the part 20 shown in FIG. 2 just prior to making the last bend which is shown at 74. In the example shown in FIGS. 7(a)-(b), the bend cannot be made with the tool 72 as shown, since a section 73 of the part 70 would have to pass through the tool 72.

The most straightforward method for testing for interference between a part and a tool would be to stimulate the bending of the part in small increments. After each incremental bend, the data processing system would test for an overlap between any portion of the part and the tool. However, such a method would require so much computation time as to be impractical.

Merely to test the part as it exists in its final bent state against the volume occupied by the tool would not be sufficient. There are instances in which a tool will interfere with the motion of a part during the bending operation but not occupy the same space as the part after the part has been bent.

The present invention solves the problem of testing for interference between a part and a tool by seeking any overlap between the part in its unbent configuration and an "expanded" tool. The manner in which an "expanded tool" is defined may be more easily understood with reference to FIG. 8(a)-(c).

Figure 8C:
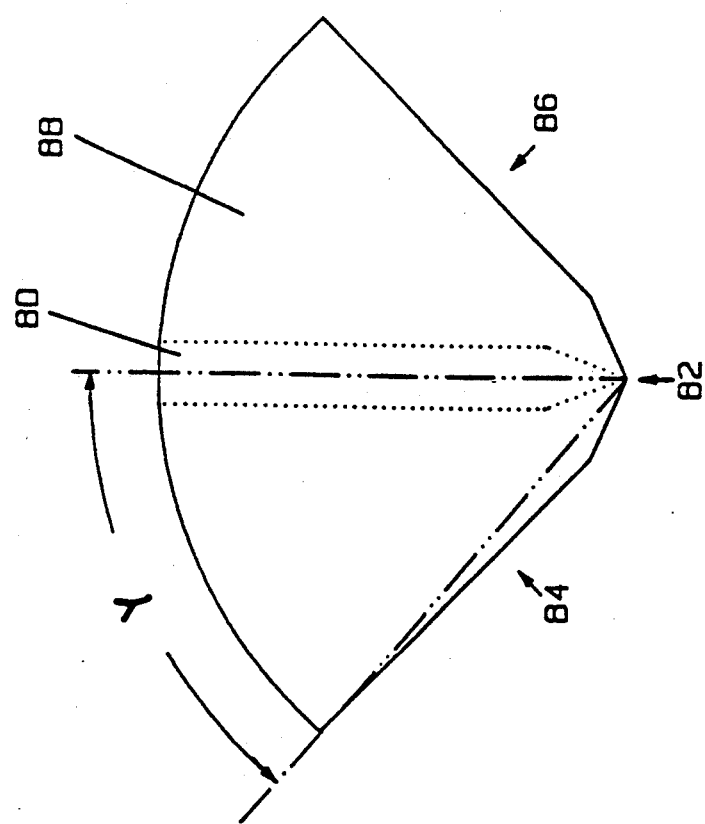
FIG. 8(c) is a cross-sectional view of an expanded tool corresponding to the tool shown in FIGS. 8(a) and 8(b)
Figure 8B:
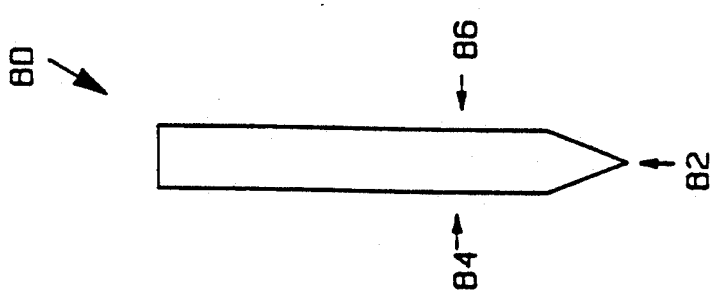
FIG. 8(b) is a cross-sectional view of the tool shown in FIG. 8(a)
Figure 8A:
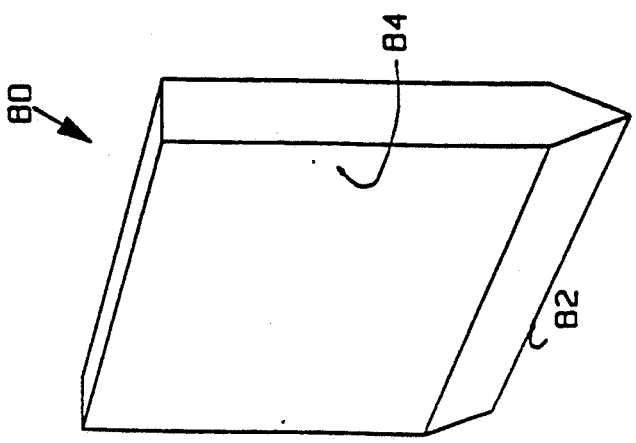
FIG. 8(a) is a perspective view of a bending tool.

FIG. 8(a) is a perspective view of a tool 80. FIG. 8(b) is a cross-sectional view of the tool 80 and FIG. 8(c) is a cross-sectional view of an expanded tool 88 generated from the tool 80. The expanded tool is calculated from the shape of the normal tool 80 and the angle of the bend which is denoted by Y. A rotation axis 82 is defined along the edge of the tool which contacts the sheet metal along the locations at which the bend is to take place. The expanded tool 88 occupies the volume occupied by tool 80 together with the volume that would be swept out if the two faces 84 and 86 of the tool 80 were rotated about the axis 82 through the angle Y as shown in FIG. 8(c).

The manner in which the system 10 tests for possible interference between other portions of a part and a tool during the bending process will now be explained in more detail with reference to FIG. 9. FIG. 9 illustrates the part 70 (as shown in FIG. 7(a)) at the stage of fabrication just prior to bending part 70 against tool 72. An expanded tool 92 corresponding to the tool 72 is positioned such that the axis 94 of the expanded tool 92 is positioned over an imaginary line 74 along the part 70 at which the bend is to take place. The system 10 then tests for any overlap between the expanded tool 92 and the part 70. In case of the part 70 and the tool 92, such an overlap occurs with respect to a portion 73 of the part 70. Accordingly, the tool 72 cannot be used to make the bend.

Having noted this overlap, the system 10 tests successive tools for interference with the part 70 until a usable tool is found or there are no more tools to test.

The smallest cutout dimensions which a tool would have to have to be usable in fabricating a bend such as the bend shown in FIG. 9 may be calculated from the overlap of the expanded tool 92 and the part 70. To accomplish this, the portion of the expanded tool 92 which overlaps the part 70 is removed. The expanded tool is then collapsed by rotating the surfaces through the angle Y about the axis 74. The resulting tool is that tool having the smallest cutout which can accommodate the overlap between the tool and the part during the bending process.

Figure 2:
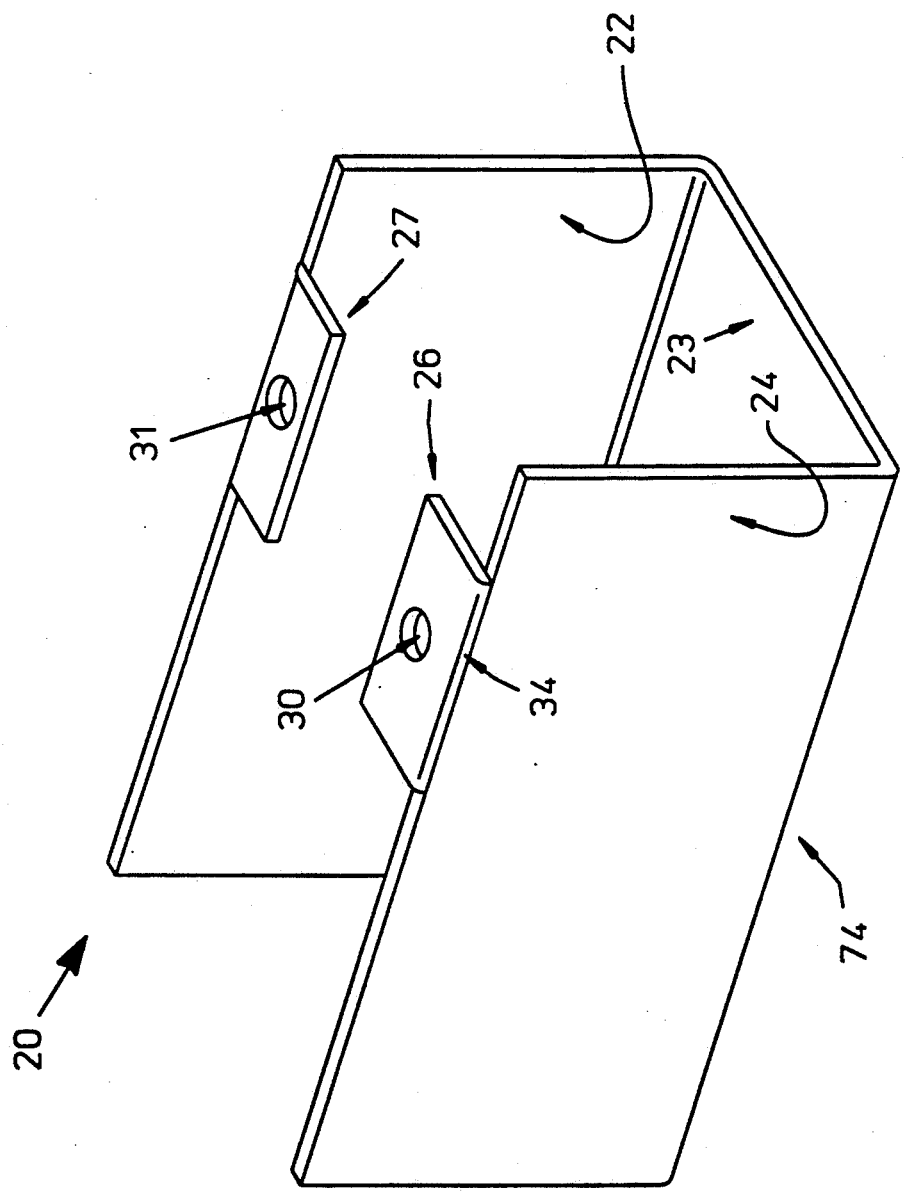
FIG. 2 is a perspective view of a sheet metal part in its fully bent state.
Figure 10:
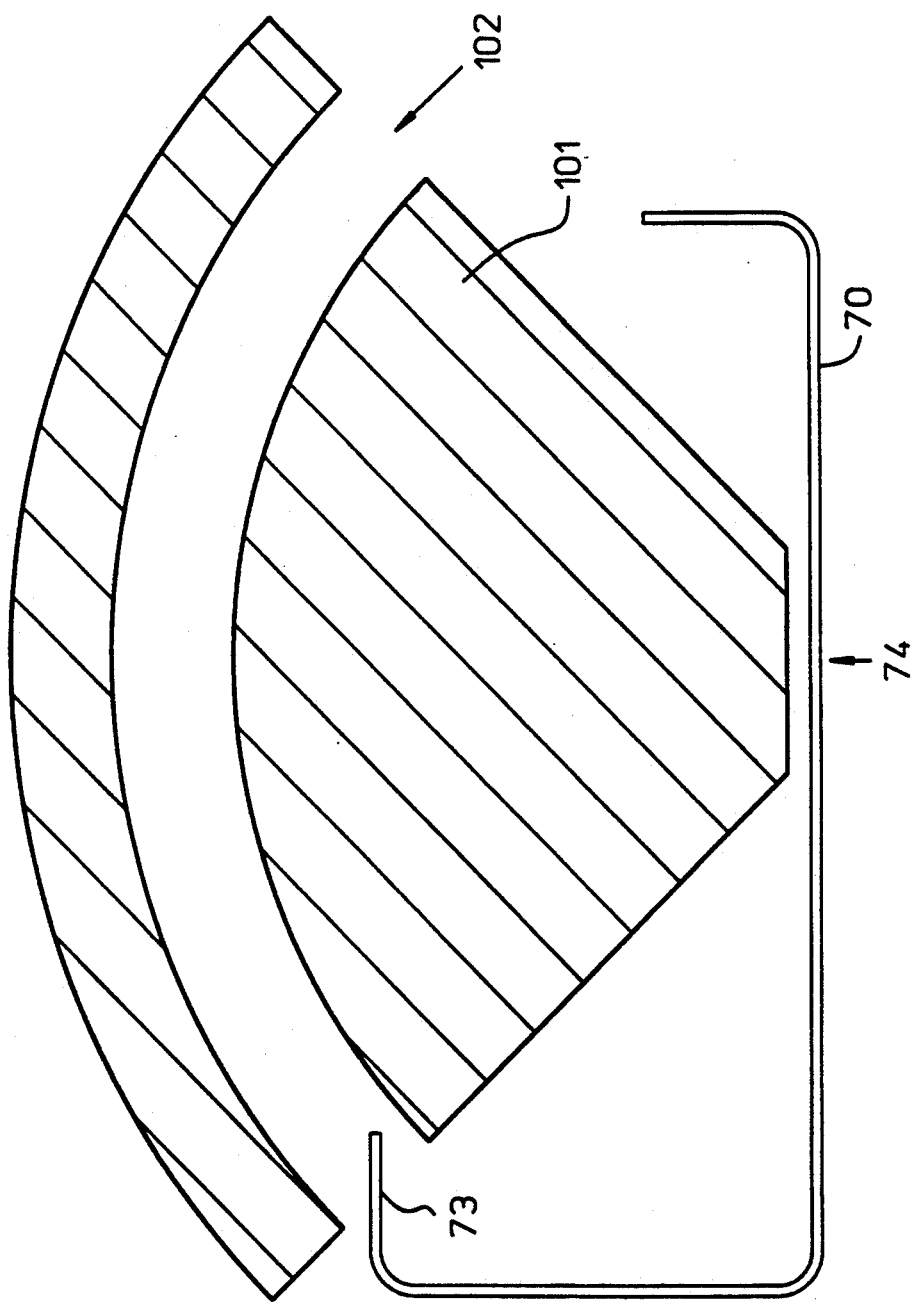
FIG. 10 is a cross-sectional view of an expanded tool corresponding to a tool having a cut-out therein and its relationship to the part shown in FIG. 9.
Figure 11:
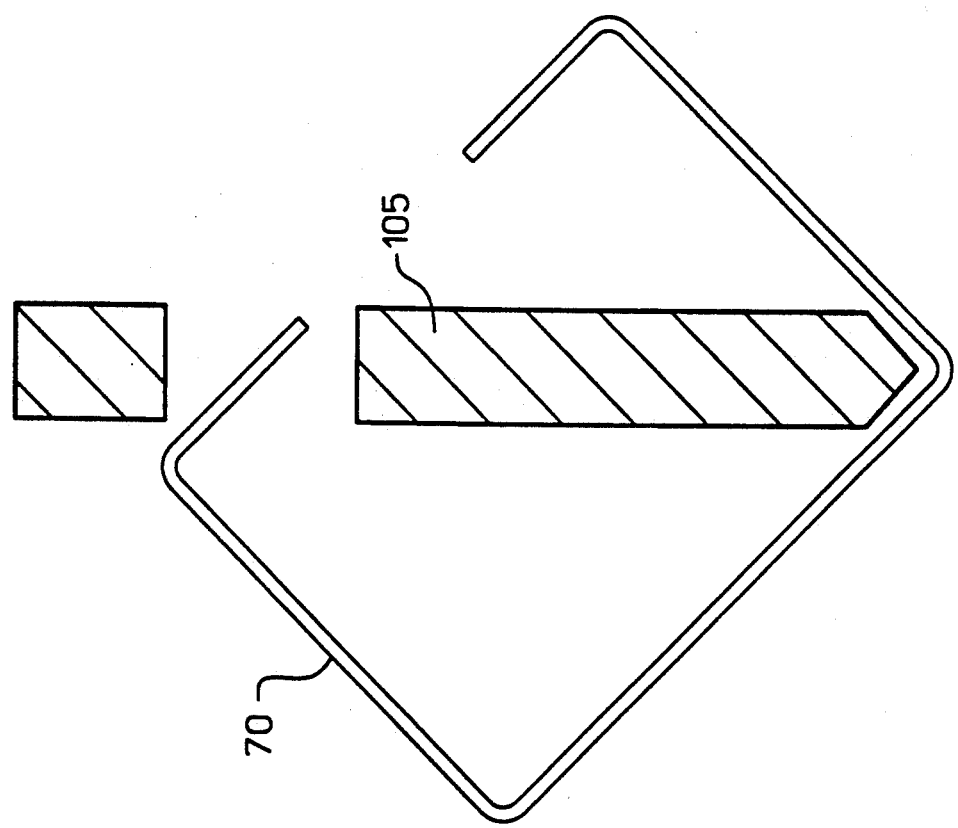
FIG. 11 is a cross-sectional view of a part after being bent using a tool with a cut-out therein.

A portion 73 of the part 70 corresponds to the tab 26 shown in FIG. 2. Since the length of the tab 26 is less than that of the side 24 of the part 20, the bend in question could be made by utilizing a tool having a cut-out such as that shown in FIG. 6. In this case, the cut-out would need to be large enough to allow portion 73 to protrude therethrough. A cross-sectional view of an expanded tool 101 corresponding to a tool with a cut-out of this type is shown in FIG. 10. The tool 101 is positioned in a manner analogous to the tool 92 as shown in FIG. 9. The cut-out region is shown at 102. It can be seen from FIG. 10 that the portion 73 of the part 70 no longer overlaps the expanded tool. Hence, the tool 101 can be used to bend the part 70 along the line 74. The part 70 and a tool 105 which corresponds with the expanded tool 101 are shown in FIG. 11 after having used the tool 105 to bend the part 70 along the line 74.

In a preferred embodiment any interference between the workpiece being bent and the tool making the bend is detected according to a novel method of collision detection; a check is made for any collision between the unfolded part and a tool which is moved as if it were sweeping out a path as described by the expanded tool described above. This method is applicable to the detection of collisions between any solid objects and is advantageously utilized in the computer-aided design of mechanical articles such as sheet metal parts according to the present invention.

A solid object can be represented mathematically as a union of a set of convex polyhedra. Each of these polyhedra in turn can be represented as an intersection of a set of linear halfspaces. It is relatively easy for a computer to manipulate such a mathematical representation of a solid object. In fact, this method of representing solid objects in a computer has been used to advantage with respect to such operations as planning a path for a robotic tool by determining the locations of any possible collisions and then causing the tool to move in such a way as to avoid those locations.

According to the present invention, two objects in relative motion, such as a tool and a mechanical article such as a sheet metal part which is under design, are represented in terms of such polyhedra and halfspaces. The computer uses these representations to construct a set of linear relations—in particular, inequalities—each of which is a function of time and position. The set of linear inequalities are then solved to determine whether the two objects collide. This information is used both to determine which tools can be used to fabricate a part and to determine the maximum size tool that can be used in a given operation.

Halfspaces which represent the various tools known to the computer are generated ahead of time and stored in the computer's database, and hence are available on demand. Halfspaces which represent the part are calculated by the computer from primitives which represent the part.

The part which is to be fabricated is represented in the computer as a combination of primitives. Primitives are simple shapes such as rectangles and cylinders. As an example of how primitives may be combined, a hole in a solid is represented as a cylinder superimposed on a rectangle.

Each primitive is described in terms of linear halfspaces. To obtain the halfspace representations which are needed to perform this method of collision detection, the halfspace representations of the various primitives which have been superimposed to provide the computer's representation of the part are added and subtracted as needed to provide a new set of halfspaces which represent the part.

To describe the method of collision detection in formal terms, the following notation will be used:

S a solid object
$A_S$ a convex polyhedron of S
$A_{Si}$ the ith polyhedron of S
$H_{Si}$ a halfspace of $A_{Si}$
$H_{Sij}$ the jth halfspace of $A_{Si}$
$K_S$ the number of convex polyhedra $A_S$ defining S
$N_{Si}$ the number of halfspaces $H_{Si}$ defining the ith polyhedron $A_{Si}$
$N_S$ the total number of halfspaces in all the polyhedra of S
$A_{Si}$ a coefficient matrix for $A_{Si}$ expressed in matrix form
$b_{Si}$ a coefficient vector for $A_{Si}$
$n_{Sij}$ a vector which is normal to $H_{Sij}$ and pointing inward
R set of all real numbers
$R^3$ set of all points in 3-dimensional (xyz) space
x a point in 3-dimensional (xyz) space
$P_{Sij}$ a point on the bounding plane of $H_{Sij}$
t time
T transpose operator
$v_S$ the velocity of S As noted above, a solid object S is represented as a union of convex polyhedra $A_S$. These polyhedra in turn is represented as an intersection of a set of planar halfspaces $H_{Si}$, giving the following expression for S:

$$S = \bigcup_{i=1}^{K_S} \bigcap_{j=1}^{N_{Si}} H_{Sij} \tag{1}$$

The total number $N_S$ of halfspaces in S is given by $$N_S = \sum_{i=1}^{K_S} N_{Si} \tag{2}$$

The jth planar halfspace $H_{Sij}$ of the ith polyhedron $A_{Si}$ is defined by a point $p_{Sij}$ on its bounding plane and a vector $n_{Sij}$ which is normal to that plane and which points into that halfspace:

$$H_{Sij} = \{x \in R^3 | n_{Sij}^T (x - p_{Sij}) \geq 0\} \tag{3}$$

The ith convex polyhedron $A_{Si}$ is given by $$A_{Si} = \{x \in R^3 | A_{Si} x \leq b_{Si}\} \tag{4}$$

where $$A_{Si} = \begin{bmatrix} -n_{Si1}^T \\ -n_{Si2}^T \\ \cdot \\ \cdot \\ \cdot \\ -n_{SiN}^T \end{bmatrix} \tag{5}$$

and $$b_{Si} = \begin{pmatrix} -n_{Si1}^T p_{Si1} \\ -n_{Si2}^T p_{Si2} \\ \cdot \\ \cdot \\ \cdot \\ -n_{SiN}^T p_{SiN} \end{pmatrix} \tag{6}$$

If S moves with velocity v starting at t=0, the halfspaces $H_{ij}$ at any later time t are given by $$H_{ij} = \{x \in R^3 | n_{Sij}^T (x - (p_{Sij} + tv)) \geq 0\} \tag{7a}$$

Rearranging equation (7a), $$H_{ij} = \{x \in R^3 | (n_{Sij}^T x - t n_{Sij}^T v_{Sij}) \geq n_{Sij}^T p_{Sij}\} \tag{7b}$$

The points x contained in $A_{Si}$ are given by $$A_{Si} = \{x \in R^3 | A_{Si} x - t A_{Si} v \geq b_{Si}\} \tag{8a}$$

or in an alternate form of expression $$[A_{Si} \ -A_{Si} v] \begin{pmatrix} x \\ t \end{pmatrix} \geq b_{Si} \tag{8b}$$

Inequality (8b), in other words, gives all the point x which are included in the ith polyhedron $A_{Si}$ at time t of the solid S moving with velocity v.

Similarly, the following inequality (9) gives all the points x which are included in the kth polyhedron $A_{Rk}$ at time t of a second solid object R moving with velocity u.

$$[A_{Rk} \ -A_{Rk} u] \begin{pmatrix} x \\ t \end{pmatrix} \geq b_{Rk} \tag{9}$$

The moving objects S and R will collide if and only if at any time $t \geq 0$ there is some point x that satisfies both inequality (8b) and inequality (9). In other words, if at any point in time any polyhedron of S attempts to occupy a point in space which is being occupied by any polyhedron of R, the objects collide; if this never happens, the objects do not collide.

To find out whether there is any time t at which any one point x is included in both a polyhedron $A_{Si}$ of S and a polyhedron $A_{Rk}$ of R, a set of linear inequalities, each inequality including a different pair of polyhedra where a pair consists of one polyhedron $A_{Si}$ of the solid and one polyhedron $A_{Rk}$ of the solid R, is solved for t and x. The set of inequalities includes all possible pairs of polyhedra $A_{Si}$ and $A_{Rk}$ and is expressed in matrix notation as follows:

$$\begin{bmatrix} A_{Si} & -A_{Si} v \\ A_{Rk} & -A_{Rk} u \\ 0 & 1 \end{bmatrix} \begin{pmatrix} x \\ t \end{pmatrix} \geq \begin{pmatrix} b_{Si} \\ b_{Rk} \\ 0 \end{pmatrix} \tag{10}$$

If no value of t can be found which satisfies matrix inequality (10), then the objects S and Q do not collide. If more than one value of t can be found, then the lowest such value gives the time at which the objects S and R first collide.

The matrix inequality (10) can be solved by any of a number of linear programming techniques which are known in the art and which will not be further described here.

A set of computations which apply the above collision detection method to determine whether a tool would intersect the part is described in pseudo-language as follows:

```
10      FOR i = 1 to K₃ DO
20          FOR k = 1 to K_R DO
30              GENERATE matrix inequality (10)
40              SOLVE matrix inequality (10)
50              IF collision occurs UPDATE time and location
                    of collision
60          NEXT k
70      NEXT i
80      END
```

The worst-case time required to perform the above computations is determined as follows. To perform one iteration of the inner loop (execute statements 30 through 50 one time) requires setting up (generating) and then solving a set of $(N_{Si} + N_{Rk} + 1)$ inequalities. Each coefficient in each inequality comes directly from the input or is computed with three additions and three subtractions. Thus, to set up the inequalities requires a time having an order equal to the total number of inequalities; in other words, a time of $O(N_{Si} + N_{Rk})$.

It has been shown that a linear programming problem with a fixed number of variables and n inequalities can be solved in $O(n)$ time. In this case the number of variables is fixed at four and the number of inequalities is ($N_{Si}+N_{Rk}+1$). Thus, to solve the inequalities requires a time of $O(N_{Si}+N_{Rk})$.

From the above it follows that the time to perform all the above calculations is proportional to $$\sum_{i=1}^{K_S} \sum_{k=1}^{K_R} (N_{Si} + N_{Rk}) = N_S N_R + K_R N_S$$

or in other words a time of O(KN) where K is the total number of all the polyhedra and N is the total number of all the halfspaces in both solids. This time is quadratic to the input size and is comparable to the time typically required to determine whether two non-moving objects intersect.

Having explained how the system 10 selects a suitable tool for each bend, the manner in which the system 10 determines an efficient order in which to make the bends will now be explained. There are a large number of possible orders in which to make the bends. One method of choosing an order would be to test each possible combination for the ones which are possible using existing tooling. These candidates would then be tested by some other criterion to determine the specific one to use. However, the number of possible combinations is too large for such a method to be a practical solution to the problem.

The present invention avoids this computational problem. The probability of an interference between a part and a tool is greatest when the part is nearest to completion. When fabrication begins, the part is flat and hence there is little chance of the tool and the part colliding during the first bend. By the time the last bend is to be made, the available space for inserting and retracting the tool would be expected to be the smallest. Hence, the probability of finding an acceptable tool is least for the last bends. If no acceptable tool exists for a particular choice of last bend, then all possible combinations which end with that choice are eliminated.

Thus the system 10 starts with the part in its fully bent shape. It then examines each bend in turn. The bend is first straightened. The resulting part is then tested against each of the possible bending tools as described above. That is, the corresponding expanded tool is placed at the location of the bend and the system 10 tests for any overlap between the part and the expanded tool. If no available tool is capable of making the bend without interference, all possible fabrication sequences which end with the bend being tested are eliminated from further consideration.

Each structure that results from straightening one bend in the part may be considered a separate part to be tested for its last possible bend. Hence, the above mentioned process is iterated by the system 10 until there are no bends in the part. At this point, all possible manufacturing orders will have been explored.

If this procedure results in more calculations than can feasibly be performed, the procedure can be truncated as desired by testing only a subset of all possible manufacturing orders. Or if a process plan is desired in minimum time, the system can be instructed to stop as soon as it has found one suitable manufacturing order.

Figure 12:
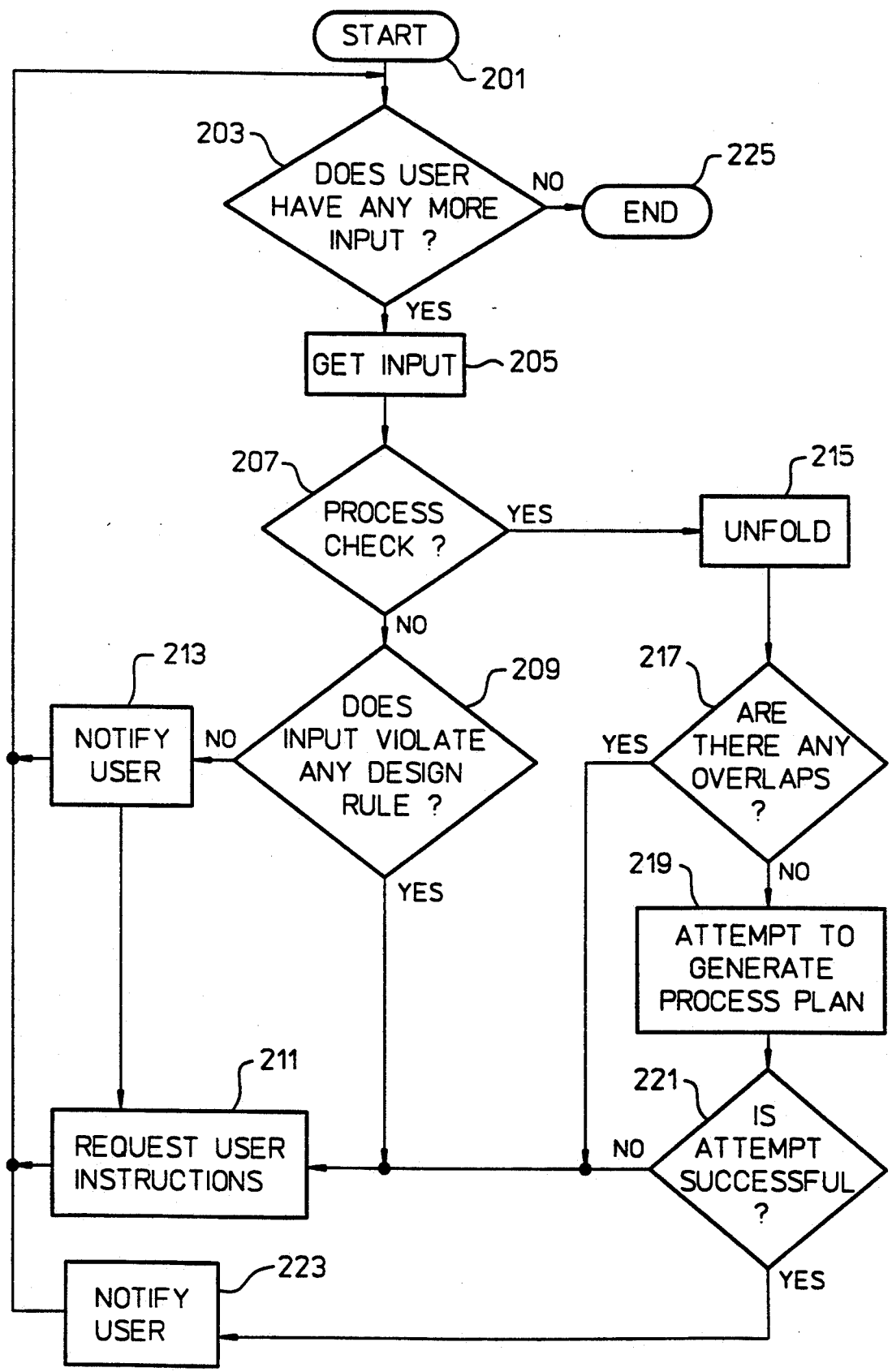
FIG. 12 is a flow chart for the top level of the CAD program utilized in the present invention.
Figure 13:
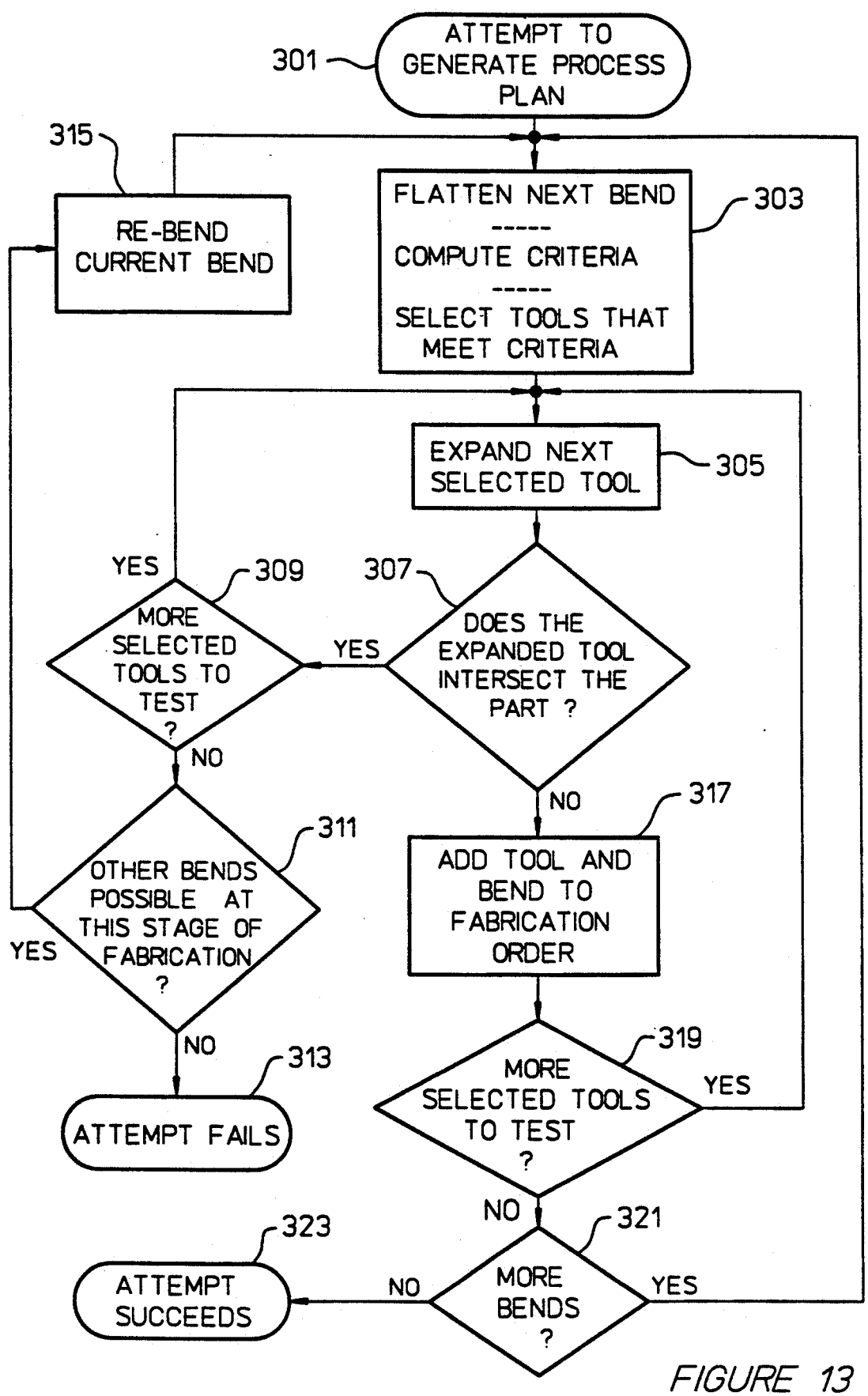
FIG. 13 is a flow chart illustrating in more detail the "Attempt to Generate a Process Plan" and "Is Attempt Successful?" blocks of the chart shown in FIG. 12.
Figure 14:
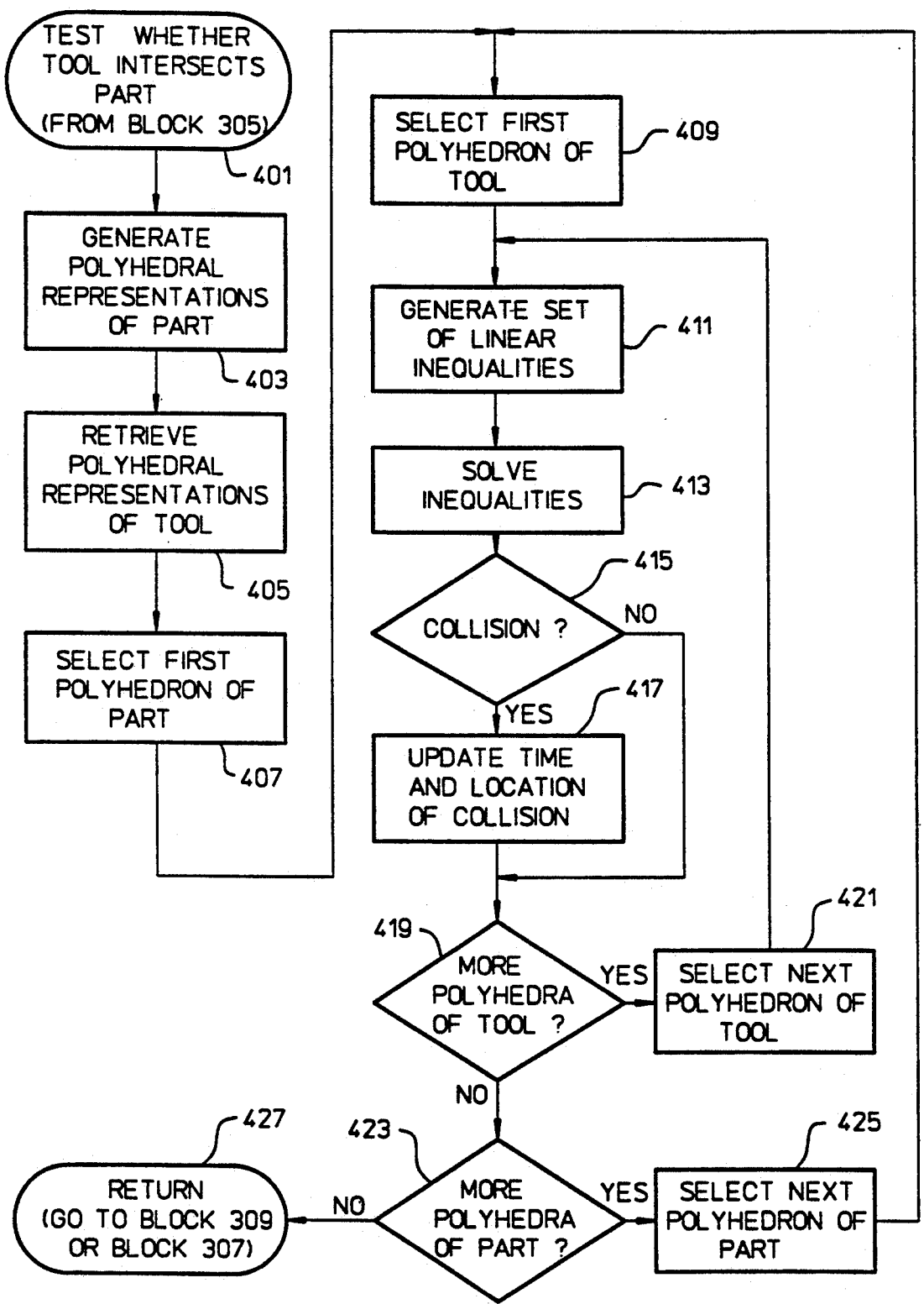
FIG. 14 is a flow chart illustrating the collision detection method which is utilized in the "Expand Next Selected Tool" and "Does the Expanded Tool Intersect the Part?" blocks, and in the "Compute Criteria" portion, of the chart shown in FIG. 13.

The above discussion can be summarized with reference to the flow charts shown in FIGS. 12, 13 and 14. FIG. 12 illustrates an upper level of the CAD program. The program begins at an initial block 201 ("start") and moves to a decision block 203 ("does user have any more input?"). If the user has data to enter, the program moves from a "yes" output of the block 203 to an input block 205 ("get input") and receives the data from the user.

Next the program moves to a decision block 207 ("process check?"). If the user has not requested a process check, the program moves from a "no" output of the block 207 to a decision block 209 ("does input violate any design rules?"). If the input violates any design rules, the program moves from a "yes" output of the block 209 to an output block 211 ("request user instructions") and thence returns to the decision block 203.

If the input does not violate any design rules, the program moves from a "no" output of the block 209 to an output block 213 ("notify user") to advise the user that the data does not violate any design rules, and design rules, and thence returns to the decision block 203.

If the user requests a process check, the program moves from a "yes" output of the block 207 to a computation block 215 ("unfold") in which all the bends to the part are flattened. The program next moves to a decision block 217 ("are there any overlaps?"). If there are any overlaps, the part cannot be made from a single sheet of material and the program moves from a "yes" output of the block 217 to the block 211 and thence back to the block 203.

If there are no overlaps, the program moves from a "no" output of the block 217 to a computation block 219 ("attempt to generate process plan") and thence to a decision block 221 ("is attempt successful?"). The blocks 219 and 221 together represent a second level program which is shown in more detail in FIG. 13 and which will be discussed presently.

If the process plan is not successfully generated, the program moves from a "no" output of the block 221 to the block 211 and thence back to the block 203. If the process plan is successfully generated, the program moves from a "yes" output of the block 221 to an output block 223 ("notify user") and thence back to the block 203.

Eventually there will be no more input from the user. When this point is reached, the program moves from a "no" output of the block 203 to a termination block 225 ("end").

As noted above, if none of the elementary surfaces overlap the program attempts to generate a process plan as shown in FIG. 13. The program begins at an initial block 301 ("attempt to generate process plan"). The part is considered to be in its fully-bent condition.

The program moves to a computation block 303 ("flatten next bend; compute criteria; select tools that meet criteria"). At this point, the program selects a bend and flattens it by increasing its angle to 180°. The program then computes any desired criteria for selecting tools and selects from the available tools those which satisfy these criteria. The program then moves to a computation block 305 ("expand next selected tool") at which one of the selected tools is expanded in the manner already described above.

Thence the program moves to a decision block 307 ("does the expanded tool intersect the part?"). If the expanded tool intersects the part, the program moves from a "yes" output of the block 307 to a decision block 309 ("more tools to test?"). If there are more expanded tools to test, the program moves from a "yes" output of the block 309 back to the block 305.

If there are no more tools to test, the program moves from a "no" output of the block 309 to a decision block 311 ("other bends possible at this stage of fabrication?"). If no other bends are possible, the part cannot be fabricated with the existing tools, and the program moves from a "no" output of the block 311 to a termination block 313 ("attempt fails"). If other bends are possible, the program moves from a "yes" output of the block 311 to a computation block 315 ("re-bend current bend") and thence back to the block 303.

If the expanded tool does not intersect the part, the program moves from a "not" output of the block 307 to a computation block 317 ("add tool and bend to fabrication order") and thence to a decision block 319 ("more selected tools to test?"). If there are more tools to test, the program moves from a "yes" output of the block 319 back to the block 305. If there are no more tools to test, the program moves from a "no" output of the block 319 to a decision block 321 ("more bends?").

It will be apparent that if it is desired to obtain only one fabrication sequence, the decision block 319 is omitted.

If there are no more bends, the program moves from a "no" output of the block 321 to a termination block 323 ("attempt succeeds"). If there are more bends, the program moves from a "yes" output of the block 321 back to the block 303.

It will be apparent that additional iteration loops can be included in the program illustrated in FIG. 13 according to how many of the possible fabrication sequences are to be explored.

Determining whether the part and a tool intersect by detecting any collision between the unfolded part and the tool is illustrated in FIG. 14. The input to the block 305 of FIG. 13 is shown as being received in a start block 401 ("test whether tool intersects part") to initiate the test. Data which represent the part and the tool are generated in blocks 403 ("generate polyhedral representations of part") and 405 ("retrieve polyhedral representations of tool"), respectively; it will be apparent that these blocks 403 and 405 could be executed in either order.

Then first polyhedra of the part and the tool are selected in blocks 407 ("select first polyhedron of part") and 409 ("select first polyhedron of tool"); these blocks can be executed in either order. Next blocks 411 ("generate set of linear inequalities") and 413 "solve inequalities" are performed. If a collision is detected, decision block 415 ("collision?") provides a "yes" output and a block 417 ("update time and location of collision") is executed. If a collision is not detected, a "no" output from the decision block 415 skips the block 417.

The system advances to a decision block 419 ("more polyhedra of tool?"). If there are more tool polyhedra to test, a "yes" output from the block 419 leads to a block 421 ("select next polyhedron of tool") and thence back to the start of the block 411. If there are no more polyhedra of the tool, a "no" output from the block 419 leads to a decision block 423 ("more polyhedra of part?").

If there are more part polyhedra to test, a "yes" output from the block 423 leads to a block 425 ("select next polyhedron of part") and thence back to the start of the block 409. If there are no more part polyhedra, a "no" output from the block 423 indicates that all possible pairs of polyhedra have been tested. Control then returns either to block 317 (if no collisions were detected) or to block 309 (if at least one collision was detected) of FIG. 13 as indicated by a termination block 427.

The sequence of steps as described above and illustrated in FIG. 14 is also preferably utilized during the execution of the "compute criteria" portion of the block 303 of FIG. 13. It may be desirable, for example, to find out the longest tool which can be used to perform a particular operation. The steps illustrated in FIG. 14 are then performed by projecting a view (e.g. a side or end view) of the tool in any desired direction until a collision is detected.

The execution time of the steps of FIG. 14 can be shortened if the only information desired is whether a collision occurs. In that event, execution stops as soon as the first collision is detected. Otherwise, all possible pairs of polyhedra are tested, and a record of the time and location of each collision is kept for later use, for example in selecting appropriate size tools.

It will be apparent that the order of selecting polyhedra can be varied as desired; that is, each polyhedron of the part could be tested against the first, second, etc., polyhedron of the tool, or each polyhedron of the tool could be tested against the first, second, etc., polyhedron of the part, and the polyhedra of the tool and the part could be chosen in any convenient order.

From the foregoing it will be apparent that the present invention provides a novel CAD system and a method of fabricating mechanical parts that permits a designer to describe a desired part and which automatically determines whether the proposed design satisfies a set of design rules, whether the design can be made, for example by bending a single sheet of material, and whether a set of available tools can do the job. One or more possible fabrication sequences are provided, and if more than one is provided an optimum one is selected.

Although the above description of the present invention has utilized bends as the only means of joining two elementary surfaces, it will be apparent to those skilled in the art that other joining mechanisms could be utilized within the teachings of the present invention.

There has been described herein a CAD system and a method for designing sheet metal parts. Various modifications to the present invention will become apparent to those skilled in the art from the foregoing description and accompanying drawings. Accordingly, the present invention is to be limited solely by the scope of the following claims.

I claim:

1. A method of using a computer to design mechanical parts, the method comprising:
   representing a desired mechanical part in the computer in terms of a plurality of convex polyhedra;
   representing each of a plurality of fabrication tools in the computer in terms of a plurality of convex polyhedra;
   computing a fabrication sequence which could be used to fabricate the part by repeatedly testing whether the part and various ones of the tools would collide if the tools were used in various fabrication steps to make the part, each test being accomplished by solving in the computer a set of linear relations among the polyhedra to determine whether a selected tool would collide with the part during relative motion along a predetermined path during a selected fabrication step; and
   communicating the computed fabrication sequence to the designer.

2. A method as in claim 1 wherein the step of representing a mechanical part comprises representing the part as a union of a set of convex polyhedra.

3. A method as in claim 2 wherein the step of representing the part further comprises computing each polyhedron in the set as an intersection of a set of linear halfspaces.

4. A method as in claim 1 wherein the step of representing a fabrication tool comprises representing the tool as a union of a set of convex polyhedra.

5. A method as in claim 4 wherein the step of representing the tool further comprises computing each polyhedron in the set as an intersection of a set of linear halfspaces.

* * * * *